(12) United States Patent
Shimada

(10) Patent No.: US 8,225,044 B2
(45) Date of Patent: Jul. 17, 2012

(54) STORAGE SYSTEM WHICH UTILIZES TWO KINDS OF MEMORY DEVICES AS ITS CACHE MEMORY AND METHOD OF CONTROLLING THE STORAGE SYSTEM

(75) Inventor: Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/206,838

(22) Filed: Aug. 10, 2011

(65) Prior Publication Data

US 2011/0296091 A1    Dec. 1, 2011

Related U.S. Application Data

(63) Continuation of application No. 12/106,607, filed on Apr. 21, 2008.

(30) Foreign Application Priority Data

Feb. 27, 2008    (JP) ................................ 2008-045731

(51) Int. Cl.
    *G06F 12/00*    (2006.01)
(52) U.S. Cl. ....................................... 711/119; 711/113

(58) Field of Classification Search .................. None
    See application file for complete search history.

(56) References Cited

U.S. PATENT DOCUMENTS

2007/0050540 A1    3/2007    Klein
2008/0104344 A1    5/2008    Shimozono et al.

*Primary Examiner* — Brian Peugh
(74) *Attorney, Agent, or Firm* — Brundidge & Stanger, P.C.

(57) ABSTRACT

Provide is a storage system including one or more disk drives, and one or more cache memories for temporarily storing data read from the disk drives or data to be written to the disk drives, in which: the cache memories includes volatile first memories and non-volatile second memories; and the storage system receives a data write request, stores the requested data in the volatile first memories, selects one of memory areas of the volatile first memories if a total capacity of free memory areas contained in the volatile first memories is less than a predetermined threshold, write data stored in the selected memory area in the non-volatile second memories, and changes the selected memory area to a free memory area. Accordingly, there can be realized capacity enlarging of the cache memory using a non-volatile memory device while realizing a high speed similar to that of a volatile memory device.

22 Claims, 10 Drawing Sheets

STORAGE SYSTEM WHICH UTILIZES TWO KINDS OF MEMORY DEVICES AS ITS CACHE MEMORY AND METHOD OF CONTROLLING THE STORAGE SYSTEM

CLAIM OF PRIORITY

The present application claims priority from Japanese application JP2008-45731 filed on Feb. 27, 2008 and is a continuation application of U.S. application Ser. No. 12/106,607, filed Apr. 21, 2008, the contents of which are hereby incorporated by reference into this application.

BACKGROUND

A technology disclosed herein relates to a storage system including a cache memory, and more particularly, to a storage system including two kinds of cache memories, that is, volatile and non-volatile cache memories.

Conventionally, a storage system including hard disk drives has been provided with a cache memory which temporarily stores data read or written by a host computer, thereby increasing speeds of reading and wring data. As a memory device used for the cache memory, conventionally, a dynamic random access memory (DRAM), which is volatile but is much faster than the hard disk drive, has generally been used. However, the DRAM is extremely expensive in terms of cost per bit compared with the hard disk drive, and thus the DRAM of an excessively large capacity cause a problem of an extremely large cost of the system. Moreover, because the DRAM is a volatile memory device, in many cases, the DRAM is provided with a battery for data retention in case of a power down. However, when a DRAM of a large capacity is provided, it is necessary to provide the battery of a large capacity as well, resulting in a problem of a further increase in the system cost.

In order to address such a problem, recently, a non-volatile memory device or, for example, a flash memory, is used as a memory device of the cache memory of a storage system in some cases. The speed of reading data from the non-volatile memory device of this kind is higher compared with the hard disk drive, but the speed is lower than that of the DRAM, and the speed of writing data is even lower than that of the DRAM. To handle this problem, a storage system may be provided with, in addition to non-volatile memory devices, memory devices such as the DRAM which is volatile but has high speed in writing, and may control these volatile memory device so that write data to the non-volatile memory device is temporarily buffered in the volatile memory device, for example, refer to US 2007/0050540. This technology equalizes fine and coarse rates of write to the non-volatile memory device.

SUMMARY

According to US 2007/0050540, because the high-speed volatile memory device is used as a buffer for the data to be stored in the non-volatile memory device, the data is always written to the non-volatile memory device eventually. Therefore, the throughput of the write as the system is limited to a low write speed of the non-volatile memory device. Moreover, the non-volatile memory device is inferior in read speed to the volatile memory device such as the DRAM, which less contributes to an increase in the speed of the data read.

This invention has been made in view of the above problems. An object of this invention is, for sufficient effect of a cache memory of a storage system, to realize capacity enlarging using non-volatile memory devices such as a flash memory while realizing a high speed similar to that of volatile memory devices such as a DRAM. Another object of this invention is to decrease the capacity of batteries provided for a power down compared with a configuration which enlarges the capacity of only volatile memory devices such as the DRAM.

According to a representative invention disclosed in this application, there is provided a storage system, comprising: a host interface coupled to a host computer; a disk drive; a drive interface coupled to the disk drive; a cache memory for temporarily storing at least one of data read from the disk drive and data to be written to the disk drive; and a control processor, wherein: the cache memory consists of a volatile first memory, and a non-volatile second memory The disk drive, the volatile first memory, and the non-volatile second memory each comprise a plurality of memory areas. Each of the plurality of memory areas of the volatile first memory and the plurality of memory areas of the non-volatile second memory comprises one of a first memory area which is associated with the memory area of the disk drive, and a second memory area which is not associated with the memory area of the disk drive. The control processor controls write and read of data to and from the volatile first memory and the non-volatile second memory; and the control processor is configured to: receive one of a request for writing data to the disk drive and a request for reading data from the disk drive; store the requested data in the volatile first memory; select, if a total capacity of the second memory area included in the volatile first memory is smaller than a predetermined threshold, one of a plurality of the first memory areas of the volatile first memory; store data stored in the selected first memory area of the volatile first memory in the non-volatile second memory; and change the selected first memory area of the volatile first memory to the second memory area.

It is possible to enlarge the capacity of a cache memory of a storage system while keeping the read and write speeds. Moreover, it is possible to decrease the size, weight, and power consumption of a system by decreasing the capacity of batteries provided for a power down.

DETAILED DESCRIPTION OF THE PREFERRED EMBODIMENTS

A description will now be given of the embodiments of this invention with reference to the drawings. The following embodiments of this invention are illustrative, and are not intended to limit this invention.

Figure 1:
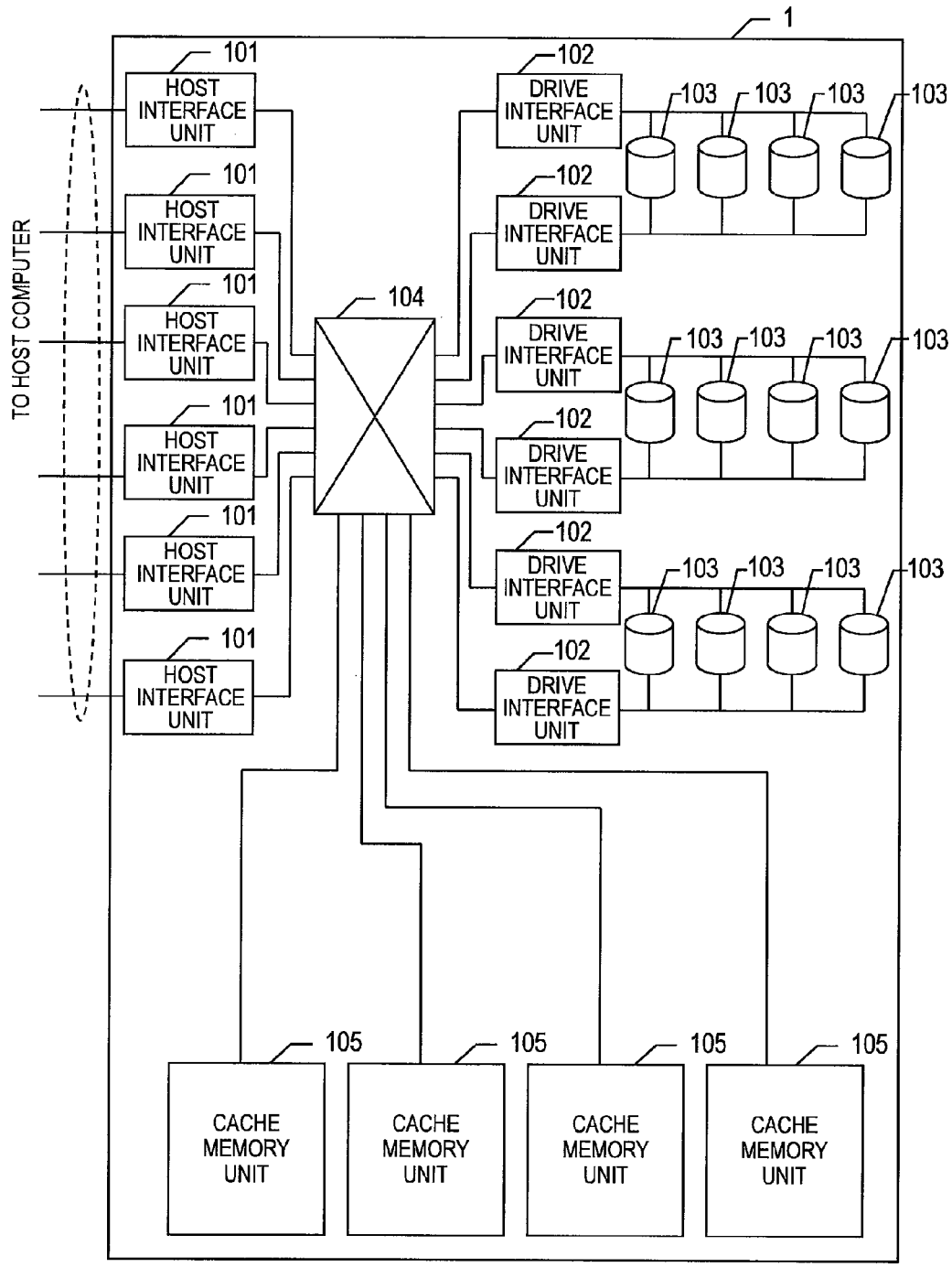
FIG. 1 is a block diagram showing an example of an overall configuration of a storage system according to the first embodiment of this invention.

FIG. 1 is a block diagram showing an example of an overall configuration of a storage system 1 according to the first embodiment of this invention.

As shown in FIG. 1, the storage system 1 includes at least one host interface unit 101, at least one drive interface unit 102, at least one disk drive 103, a transfer unit 104, and at least one cache memory unit 105.

The host interface unit 101 is coupled to a host computer (not shown), and communicates data with the host computer. The drive interface unit 102 is coupled to a plurality of disk drives 103, and controls the disk drives 103. The cache memory unit 105, according to a request received by the host interface unit 101 from the host computer, temporarily stores data read from the disk drive 103 and data to be written to the disk drive 103.

The transfer unit 104 couples between the host interface units 101 and the cache memory units 105, and between the drive interface units 102 and the cache memory units 105. In FIG. 1, the single transfer unit 104 couples between the host interface units 101 and the cache memory units 105, and between the drive interface units 102 and the cache memory units 105, but a plurality of transfer units 104 may be provided. At least one of the plurality of transfer units 104 may couple between the host interface units 101 and the cache memory units 105, and at least another one of the plurality of transfer units 104 may couple between the drive interface units 102 and the cache memory units 105.

Figure 2:
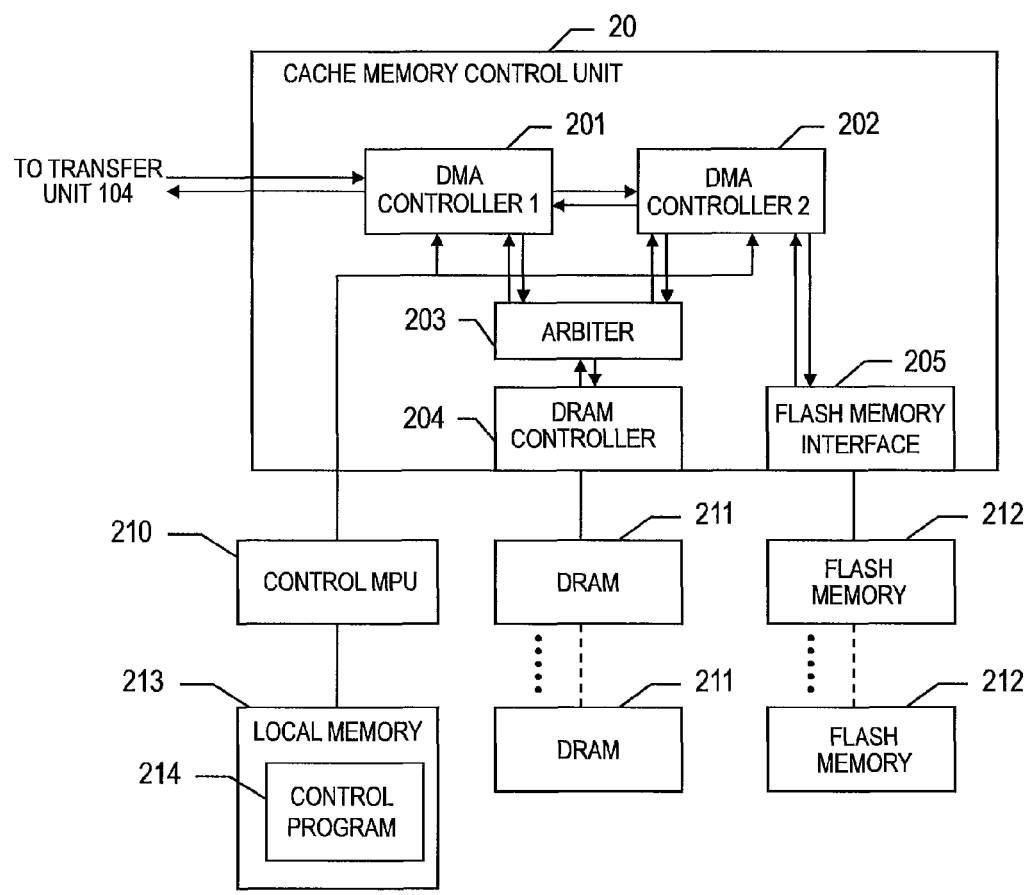
FIG. 2 is a block diagram showing an example of a configuration of a cache memory unit according to the first embodiment of this invention.

FIG. 2 is a block diagram showing an example of a configuration of the cache memory unit 105 according to the first embodiment of this invention.

In FIG. 2, a DRAM 211 is a high-speed and volatile memory device. A flash memory 212 is non-volatile and low speed memory device compared with the DRAM 211. The cache memory unit 105 may include a plurality of DRAM's 211 and a plurality of flash memories 212. The DRAM's 211 and the flash memories 212 are each coupled to, and controlled by a cache memory control unit 20.

The total capacity of all the DRAM's 211 and the total capacity of all the flash memories 212 contained in the respective cache memory units 105 are arbitrary. It should be noted that, in order to reduce the cost of the entire cache memory unit 105, it is desirable that the total capacity of all the flash memories 212 be larger than the total capacity of all the DRAM's 211.

The cache memory control unit 20 includes a DMA controller 1_201, a DMA controller 2_202, an arbiter 203, a DRAM controller 204, and an flash memory interface 205.

The cache memory control unit 20 is coupled to a control micro processing unit (MPU) 210 for controlling the entire cache memory unit 105. A local memory 213 may be coupled to the control MPU 210. The local memory 213 stores a control program 214 executed by the control MPU 210, for example.

The DMA controller 1_201 is coupled to the transfer unit 104, and controls transfer of data between the DRAM 211 or the DMA controller 2_202 and the transfer unit 104. The DMA controller 2_202 controls transfer of data between the DRAM 211 or the DMA controller 1_201 and the flash memory 212. The arbiter 203 arbitrates access from the DMA controller 1_201 and the DMA controller 2_202 to the DRAM 211. The DRAM controller 204 controls the DRAM's 211. The flash memory interface 205 is coupled to the flash memories 212, and controls the flash memories 212.

The control MPU 210, by controlling the DMA controller 1_201 and the DMA controller 2_202 according to the control program 214, for example, can control writing data to, reading data from, and deleting data from the DRAM's 211 and the flash memories 212, and the like. In the following description, processes executed by the cache memory unit 105 are actually controlled by the control MPU 210 as described above.

Figure 3:
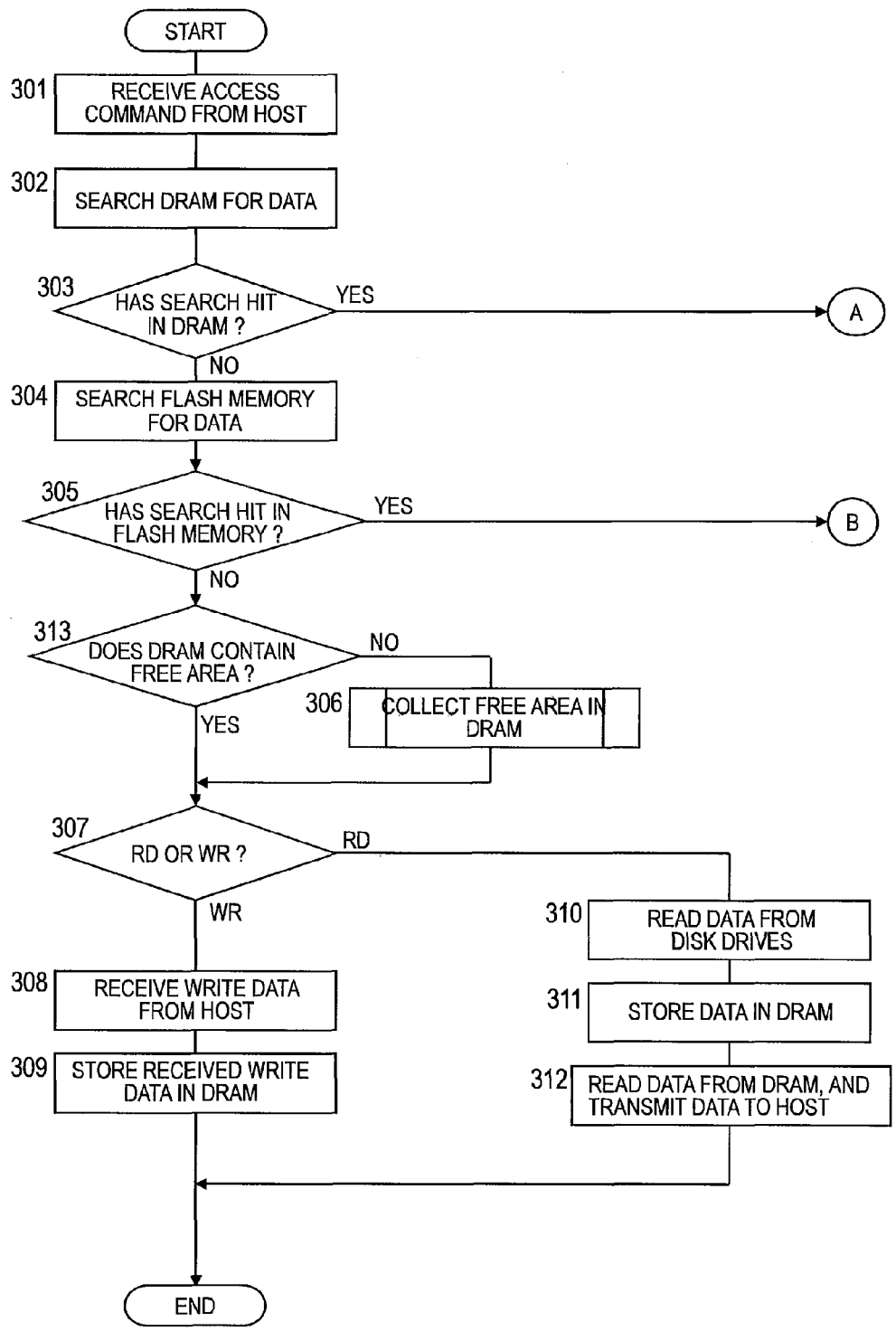
FIG. 3 is a flowchart showing an example of a process for controlling the storage system according to the first embodiment of this invention.

FIG. 3 is a flowchart showing an example of a process for controlling the storage system 1 according to the first embodiment of this invention.

In FIG. 3, first, a request from the host computer is received as an access command (step 301). Specifically, after the host interface unit 101 receives the access command from the host computer, the host interface unit 101 analyzes the access command, and selects a disk drive 103 which stores data to be accessed, and a cache memory unit 105 which temporarily stores the accessed data. This analysis of the access command may be performed by another part of the storage system 1.

Then, the selected cache memory 105 determines whether the requested data is present in the DRAM 211 (namely, whether a memory area associated with a data block of the disk drive 103 specified as an access target by the access request is present in the DRAM 211) (step 302). Management of the associations as described above, and a search based on those associations may be performed by a well-known cache memory control technology. For example, a logical block address indicating a data block of the disk drive 103 associated with a memory area of the cache memory unit 105 may be recorded in the cache memory unit 105. The same applies to a search in a step 304 described later. Moreover, the search as described above may be processed by the access to the cache memory unit 105 by the host interface unit 101. Alternatively, in the storage system 1, there may additionally be provided a processor unit for processing the search control.

Then, it is determined whether the search has hit or not (namely, whether the requested data is present in the DRAM 211 or not) (step 303). If the requested data is not present in the DRAM 211, the process proceeds to step 304. On the other hand, if the requested data is present in the DRAM 211, the process proceeds to step 405 of FIG. 4, which will be described later.

Then, in the step 304, it is searched whether the requested data is present in the flash memory 212 of the cache memory 105 or not (namely, whether a memory area associated with the data block of the disk drive 103 specified as the access target by the access request is present in the flash memory 212 or not). The search as described above may also be processed by the access to the cache memory unit 105 performed by the host interface unit 101. Alternatively, in the storage system 1, there may additionally be provided a processor unit for processing the search control.

Then, it is determined whether the search has hit or not (namely, whether the requested data is present in the flash memory 212 or not) (step 305). If the requested data is not present in the flash memory 212, it means that the requested data has not been stored in the cache memory unit 105 (namely, the requested data is stored only in the disk drive 103). In this case, the process proceeds to a step 313. On the other hand, if the requested data is present in the flash memory 212, the process proceeds to a step 401 in FIG. 4, which will be described later.

In the step 313, it is determined whether the DRAM 211 still has a free area. A free area is a memory area of the DRAM 211 which is not associated with any data blocks of the disk drive 103. If the DRAM 211 has a free area, the process proceeds to a step 307. If the DRAM 211 does not have a free area, the process proceeds to a step 306.

In the step 306, a free area is collected in the DRAM 211. A DRAM free area collection process performed in this step is detailed later, see FIGS. 5 and 6. The free area collection process may be performed by the host interface unit 101, which has received the access command from the original host computer, or by the cache memory unit 105. Alternatively, in the storage system 1, there may additionally be provided a processor unit for processing the free area collection.

Then, in the step 307, it is determined whether the request received from the host computer is a read (RD) request or a write (WR) request. If the request is a WR request, the process proceeds to a step 308, and the cache memory unit 105 receives write data sent by the host computer from the host interface unit 101 via the transfer unit 104.

Then, the cache memory unit 105 stores the received write data in the free area of the DRAM 211 collected in the step 306 (step 309).

If the request received from the host computer is an RD request in the step 307, the process proceeds to a step 310. In the step 310, the requested data is read from the disk drive 103, and sent to the cache memory unit 105. Then, the cache memory unit 105 stores the requested data in the free area collected in the step 306 (311). Then, the cache memory unit 105 reads data stored in the DRAM 211 and sends the data to the host interface unit 101 via the transfer unit 104, and the host interface unit 101 sends the data to the host computer, which is the original requester of the data (step 312).

Figure 4:
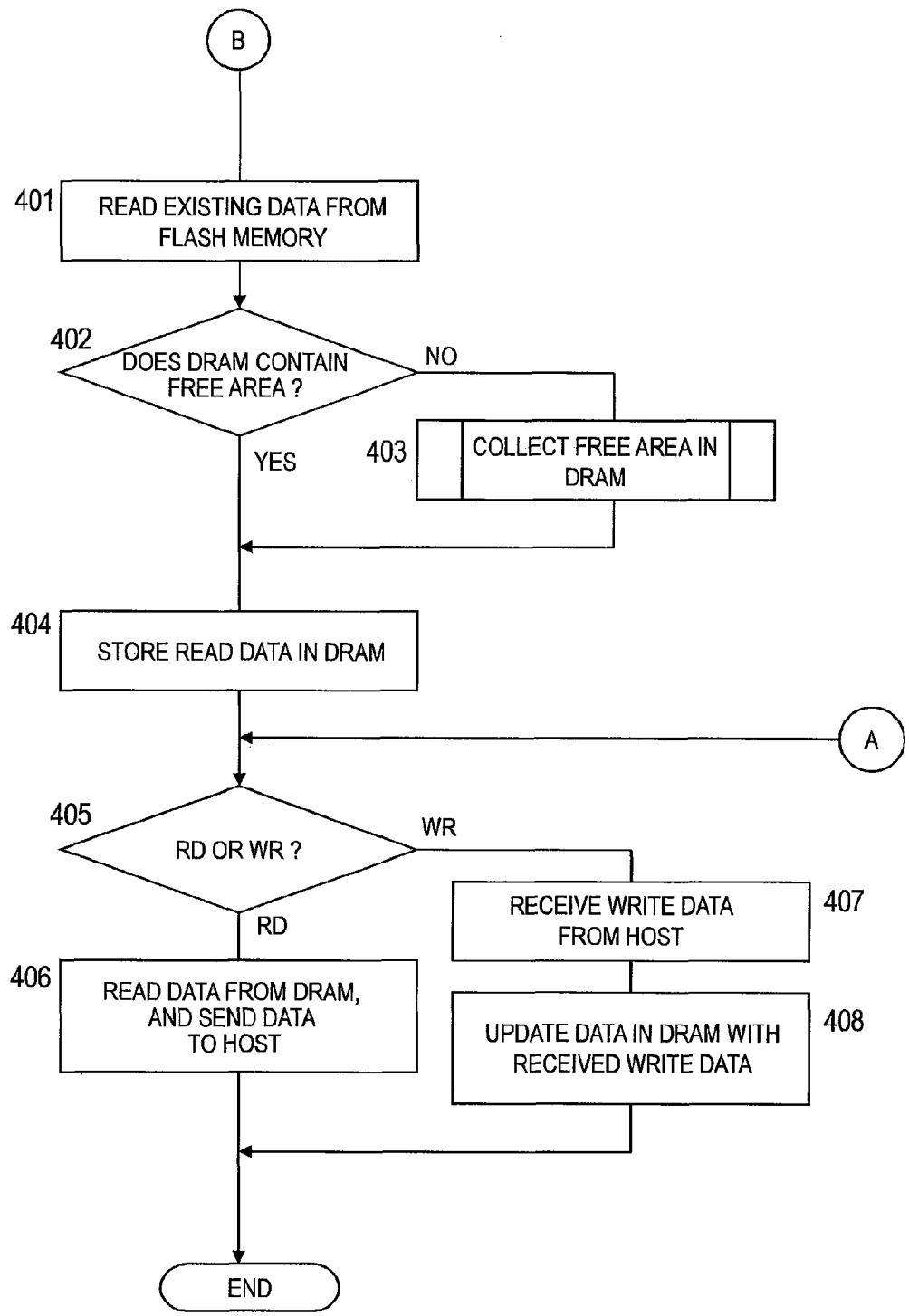
FIG. 4 is a flowchart showing an example of a process performed upon a cache hit in the storage system according to the first embodiment of this invention.

FIG. 4 is a flowchart showing an example of a process performed upon a cache hit in the storage system 1 according to the first embodiment of this invention.

Specifically, the process of FIG. 4 is the first example of a process performed if it is determined that the requested data is present in the DRAM 211 in the step 303 of FIG. 3, and if it is determined that the requested data is present in the flash memory 212 in the step 305 of FIG. 3.

If it is determined that the requested data is present in the flash memory 212 in the step 305 of FIG. 3, the process proceeds to the step 401. In the step 401, the cache memory unit 105 reads the requested data from the flash memory 212.

Then, in a step 402, the cache memory unit 105 determines whether the DRAM 211 still has a free area. If the DRAM 211 has a free area, the process proceeds to a step 404. If the DRAM 211 does not have a free area any more, the process proceeds to a step 403.

In the step 402, even when there is a free area left in the DRAM 211, if the total capacity of the free areas is equal to or less than a predetermined threshold, it may be determined that there is not free area any more, and the process may proceed to the step 403.

In the step 403, the DRAM free area collection process similar to that in the step 306 of FIG. 3 is performed. This free area collection process may be performed by the host interface unit 101, which has received the access command from the original host computer, or the cache memory unit 105, as in the step 306 of FIG. 3. Alternatively, in the storage system 1, there may additionally be provided a processor unit for carrying out the free area collection. Then, the control process proceeds to the step 404.

In the step 404, the cache memory unit 105 stores the data read from the flash memory 212 in the step 401 in the free area of the DRAM 211. Then, the process proceeds to the step 405.

If it is determined that the requested data is present in the DRAM 211 in the step 303 of FIG. 3, the process also proceeds to the step 405.

In the step 405, it is determined whether the request received from the host computer is a read (RD) request or a write (WR) request. If the request is an RD request, the process proceeds to a step 406. In the step 406, the cache memory unit 105 reads the requested data from the DRAM 211, and sends the data to the host interface unit 101 via the transfer unit 104, and the host interface unit 101 sends the data to the host computer, which is the original requester of the data.

In the step 405, if the cache memory unit 105 determines that the request is a WR request, the process proceeds to a step 407. In the step 407, the cache memory unit 105 receives write data from the host computer via the host interface unit 101 and the transfer unit 104. Then, in a step 408, the cache memory unit 105 updates the corresponding data in the DRAM 211 with the received write data (in other words, overwrites the data in the DRAM 211 by the received write data). On this occasion, the corresponding data in the DRAM 211 is the data stored in a block (not shown) of the DRAM 211 associated with a data block (not shown) of the disk drive 103 specified by the write request as a target of write. Moreover, a block is a unit of management of the memory area.

Through the above process, the data newly accessed by the host computer is stored in the DRAM 211 irrespective of whether the access is a read (RD) access or a write (WR) access. Therefore, it is possible to increase the possibility of the hit in the DRAM 211 for subsequent access. Moreover, because the data written by the host computer is stored in the DRAM 211, the write is processed quickly.

Figure 5:
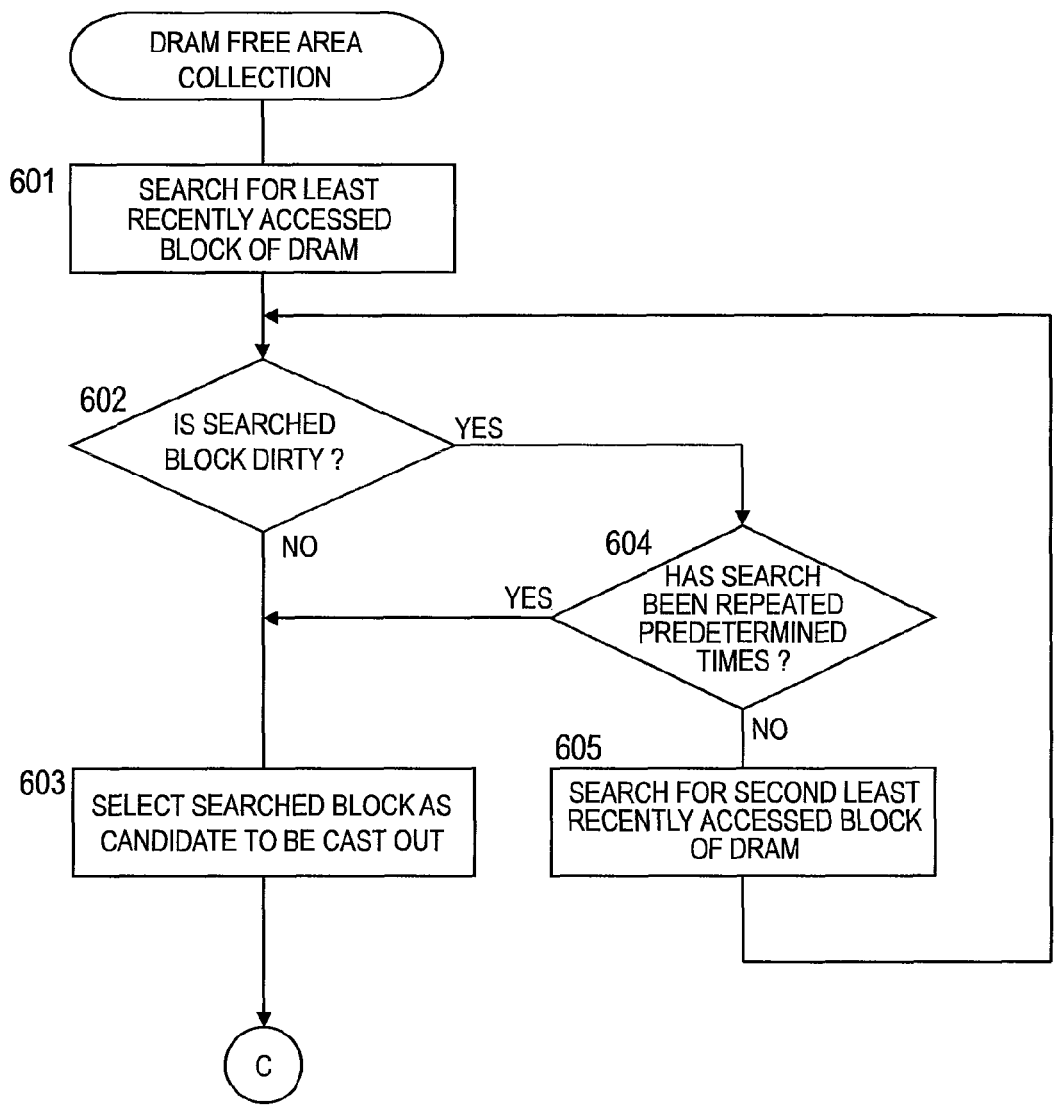
FIGS. 5 and 6 are flowcharts showing an example of a free area of DRAM collection process performed in the storage system according to the first embodiment of this invention.
Figure 6:
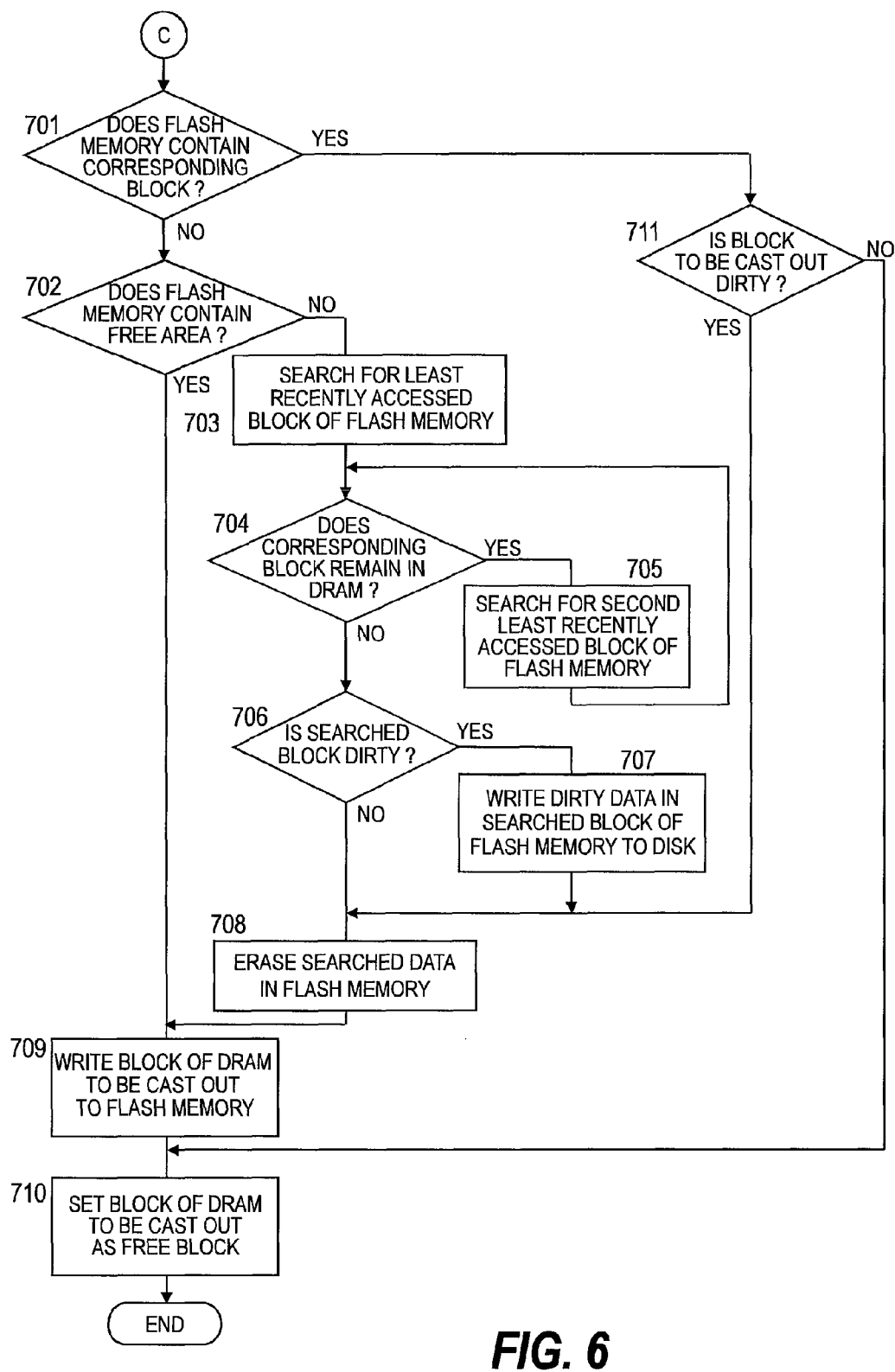

FIGS. 5 and 6 are flowcharts showing an example of the DRAM free area collection process performed in the storage system 1 according to the first embodiment of this invention.

Specifically, the process shown in FIGS. 5 and 6 is performed in the step 306 of FIG. 3 and the step 403 of FIG. 4. The process shown in FIGS. 5 and 6 may be performed by the host interface unit 101, which has received the access command from the original host computer, or by the cache memory unit 105. Alternatively, in the storage system 1, there may additionally be provided a processor unit for carrying out the free area collection. Hereinafter, a description will be given assuming the process is performed by the cache memory unit 105, as an example.

First, the cache memory unit 105 searches blocks of the DRAM 211, which store data, for a block which has been accessed least recently (step 601). This search and similar searches described later such as a search in a step 605 can be performed according to the well-known least recently used (LRU) algorithm which is applied to a conventional cache memory.

Then, in a step 602, the cache memory unit 105 determines whether or not data stored in the searched block is in the so-called dirty state. Data in a block of the DRAM 211 in the dirty state indicates that at least a part of the data stored in the block of the DRAM 211 has not been stored in the disk drive 103 yet (namely, at least a part of the data stored in the block of the DRAM 211 is different from data stored in a block of the disk drive 103 corresponding to the block of the DRAM 211). If the data in the searched block is not in the dirty state, the process proceeds to a step 603.

In the step 603, the cache memory unit 105 selects the searched block as a candidate to be cast out. Then, the process proceeds to a step 701 of FIG. 6.

On this occasion, casting out of a block means changing the block of the DRAM 211 to a free area. At the same time, if necessary, a replication of the data stored in this block is to be stored either in the flash memory 212 or in the disk drive 103, or in the both.

In the step 602, if the cache memory unit 105 determines that the data in the searched block is dirty, the process proceeds to a step 604. In the step 604, the cache memory unit 105 determines whether the search has been repeated a predetermined number of times. Specifically, the cache memory unit 105 determines whether the searches in the step 601 and the step 605, which will be described later, have been performed the predetermined number of times. If it is determined that the searches have been repeated the predetermined number of times, the process proceeds to the step 603. If it is determined that the searches have not been repeated the predetermined number of times, the process proceeds to the step 605.

If, in the step 604, the cache memory unit 105 determines that the searches have been repeated the predetermined number of times, the cache memory unit 105, in the step 603, may select a block searched in the last step 605 as the candidate to be cast out, or the block searched in the step 601 as the candidate to be cast out.

In the step 605, the cache memory unit 105 searches for the next least recently accessed block of the DRAM 211. Then, the process returns to the step 602.

After the step 603 of FIG. 5 is performed, the process proceeds to the step 701 of FIG. 6. In the step 701, the cache memory unit 105 determines whether the flash memory 212 contains a block corresponding to the block selected as the candidate to be cast out (referred to as block to be cast out hereinafter) in the step 603 in FIG. 5.

A block of the flash memory 212 corresponding to the block to be cast out is a block of the flash memory 212 associated with the data block of the disk drive 103 associated with the block of the DRAM 211 to be cast out. In other words, if such a block is present, one data block of the disk drive 103 is associated with both the block of the DRAM 211 to be cast out and the block of the flash memory 212.

If the flash memory 212 does not have a block corresponding to the block to be cast out, the process proceeds to a step 702.

In the step 702, the cache memory unit 105 determines whether the flash memory 212 contains a free area. If the flash memory 212 contains a free area, the process proceeds to a step 709.

In the step 709, the cache memory unit 105 stores data in the block to be cast out in the free area of the flash memory 212.

Then, in a step 710, the cache memory unit 105 sets the block to be cast out of the DRAM 211 as a free block. Specifically, the cache memory unit 105 dissociates the block to be cast out and the block of the disk drive 103 from each other. As a result, subsequently, an arbitrary block of the disk drive 103 can be newly associated with the dissociated block to be cast out.

In the step 702, if the cache memory unit 105 determines that the flash memory 212 does not contain a free area, the process proceeds to a step 703. In the step 703, the cache memory unit 105 searches for the least recently accessed block of the flash memory 212.

Then, the cache memory unit 105 determines whether data in the block of the flash memory 212 searched in the step 703 (or in a step 705 described later) still remains in the DRAM 211 (namely, whether the block of the disk drive 103 associated with the block of the flash memory 212 searched in the step 703 is also associated with a block of the DRAM 211) (step 704).

If the data still remains in the DRAM 211, the process proceeds to the step 705. In the step 705, the cache memory unit 105 searches for the next least recently accessed block of the flash memory 212. Then, the process returns to the step 704.

In the step 704, if the cache memory unit 105 determines that the data does not remain in the DRAM 211, the process proceeds to a step 706.

In the step 706, the cache memory unit 105 determines whether or not data in the searched block of the flash memory 212 is in the dirty state. The data in the block of the flash memory 212 in the dirty state indicates that at least a part of the data stored in the block of the flash memory 212 has not been stored in the disk drive 103 yet (namely, at least a part of the data stored in the block of the flash memory 212 is different from data stored in a block of the disk drive 103 corresponding the block of the flash memory 212).

If the data in the searched block is in the dirty state, the process proceeds to a step 707. In the step 707, the cache memory unit 105 writes the data in the searched block of the flash memory 212 to the disk drive 103. Then, the process proceeds to a step 708.

In the step 706, if the cache memory unit 105 determines that the searched block is not in the dirty state, the step 707 is not performed, and the process proceeds to the step 708.

In the step 708, the cache memory unit 105 erases the searched block of the flash memory 212, and sets the block as a free area. Then, the process proceeds to the step 709.

In the step 701, if the cache memory unit 105 determines that the flash memory 212 contains a block corresponding to the block of the DRAM 211 to be cast out, the process proceeds to a step 711.

In the step 711, the cache memory unit 105 determines whether or not data in the block of the DRAM 211 to be cast out is in the dirty state. If the cache memory unit 105 determines that the block to be cast out is not in the dirty state, the process proceeds to the step 710. In this case, the block to be cast out and the block of the flash memory 212 corresponding thereto store the same data. Therefore, in the step 710, the cache memory unit 105, without copying the data from the block of the DRAM 211 to be cast out to the flash memory 212, sets the block to be cast out of the DRAM 211 to a free block.

In the step 711, if the cache memory unit 105 determines that the data in the block to be cast out is dirty, the process proceeds to the step 708. In this case, the cache memory unit 105 erases the searched block of the flash memory 212 (step 708), and performs the subsequent processes in the steps 709 and 710.

In the step 702, even when there is a free area left in the flash memory 212, if the total capacity of the free areas is equal to or less than a predetermined threshold, it is determined that there is not free area any more, and the process may not proceed to the step 709, but may proceed to the step 703.

In a conventional cache memory, the hit rate is an important parameter which determines a degree of performance obtained by using the cache memory. Therefore, in the conventional cache memory, in expectation of an increase in hit rate, cast out of data is generally performed according to the LRU algorithm. According to the LRU algorithm, based on an assumption that the least recently accessed block has the lowest access rate (namely, the least recently accessed block has the lowest possibility of access in the future), data in the block least recently accessed is cast out.

However, when a cache memory is configured from two kinds of memories different in access speed (such as the DRAM 211 and the flash memory 212) as in this invention, the degree of the increase in performance depends on the access frequencies to the respective memories in addition to the hit rate. Because the write speed to the flash memory 212 is especially low, if the rate of the write access to the flash memory 212 increases, the performance largely degrades.

Therefore, according to this embodiment, while maintaining the hit rate, write and cast out of data are controlled so as to realize a low access rate to the flash memory 212, especially a low write access rate to the flash memory 212.

Specifically, in this embodiment, write data is stored in the DRAM 211 at first (see the steps 309 and 408). As a result, as long as data does not overflow from the DRAM 211, access to the flash memory 212 does not occur, and the performance is prevented from degrading due to the access to the flash memory 212.

If the DRAM 211 does not have a free area, among the blocks of the DRAM 211, data in a block lower in the access rate than the predetermined value, and low in the write access rate is cast out by priority, and is stored in the flash memory 212 (see FIG. 5).

The possibility of write access is predicted based on whether data is dirty or not. When data in a block is dirty, it indicates that the data has relatively recently been written. Therefore, it is predicted that the possibility of write access to a dirty block is higher than that to a non-dirty block (namely, in the future, a possibility of occurring a write access to the dirty block is higher than a possibility of occurring a write access to the non-dirty block). Thus, a non-dirty block is selected by priority as a block to be cast out (see the steps 602 and 603).

The access rate is predicted based on the LRU algorithm as in the conventional case (see the step 601). Whether or not the access rate is lower than the predetermined value is determined in the step 604. As the "predetermined number" increases in the step 604, it is expected that the write access to the flash memory 212 be restrained. However, the possibility of decrease in hit rate increases. Thus, it is desirable that the "predetermined number" be determined so as to maximize the performance affected by those factors.

According to the first embodiment of this invention, the data cast out from the DRAM 211 is stored in the flash memory 212. If a block corresponding to the block of the DRAM 211 to be cast out is present in the flash memory 212, the data cast out from the DRAM 211 is stored in the corresponding block. If the block of the DRAM 211 to be cast out is not dirty, because the cast-out data is the same as data which has already been stored in a corresponding block of the flash memory 212, the cast-out data is not written to the flash memory 212 (see the steps 701, and, 708 to 711).

If the flash memory 212 does not contain a block corresponding to a block to be cast out of the DRAM 211, and does not have a free area, a free area is created by deleting data in any block (see the steps 703 to 708).

On this occasion, data of a less recently accessed block is erased by priority (see the steps 703 and 705).

Further, the cache memory unit 105 determines, among flash memory 212, whether the DRAM 211 has a block corresponding to the block of the flash memory 212 (step 704). Then, if the DRAM 211 does not contain a block corresponding to the block of the flash memory 212, data in the block of the flash memory 212 is erased by priority. In other words, if the DRAM 211 contains a block corresponding to the block of the flash memory 212, the cast out of the data is controlled in order not to erase the block of the flash memory 212.

Data in a block of the DRAM 211 may be cast out to the flash memory 212 in the future. When the data is cast out, if the flash memory 212 has blocks corresponding to the block to be cast out of the DRAM 211, and those blocks store the same data, it is not necessary to newly write the data to be cast out to the flash memory 212 ("NO" in the step 711). Thus, by determination in the step 704, it is possible to prevent the performance from degrading due to the write access to the flash memory 212.

Further, data in a dirty block is erased by priority from the flash memory 212 (steps 706 and 708).

As described above, with reference to FIGS. 5 and 6, data in a block, which is not dirty, is stored by priority in the flash memory 212, and data in a block, which is dirty, is erased by priority from the flash memory 212. In this way, by reducing dirty data stored in the flash memory 212, it is possible to prevent the performance from degrading due to the write access to the flash memory 212.

A description will now be given of the second embodiment of this invention.

Figure 7:
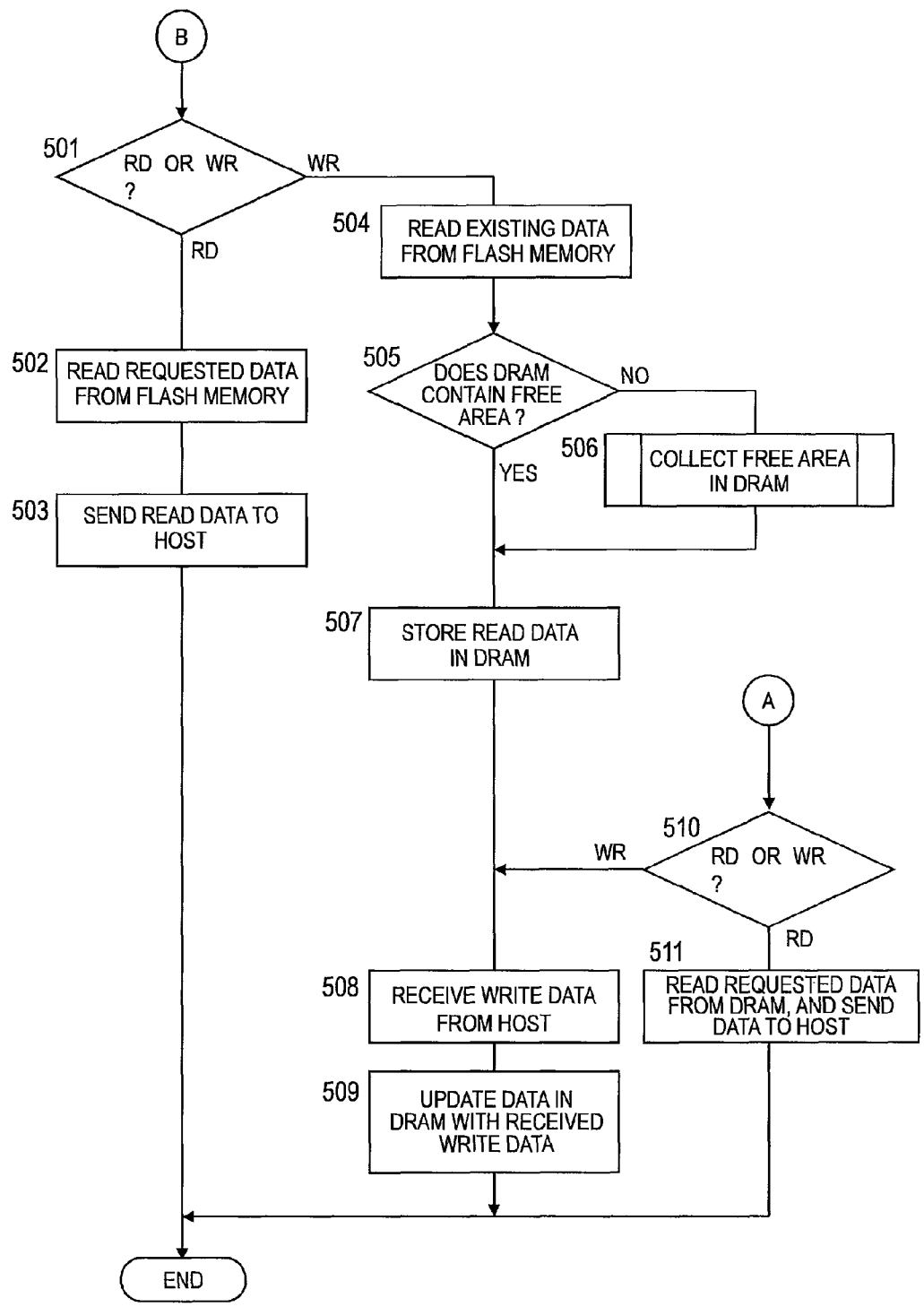
FIG. 7 is a flowchart showing an example of a process performed upon a cache hit in the storage system according to the second embodiment of this invention.

FIG. 7 is a flowchart showing an example of a process performed upon a cache hit in the storage system 1 according to the second embodiment of this invention.

Specifically, the process of FIG. 7 is the second example of the process performed if it is determined that the requested data is present in the DRAM 211 in the step 303 of FIG. 3, and if it is determined that the requested data is present in the flash memory 212 in the step 305 of FIG. 3.

Configurations of the storage system 1 and the cache memory unit 105 of the second embodiment of this invention are the same as those of the first embodiment (see FIGS. 1 and 2). In the storage system 1 according to the second embodiment of this invention, except that a process shown in FIG. 7 is performed in place of the process shown in FIG. 4, the same process as that of the first embodiment of this invention is performed. Hereinafter, a description will be given of only cases of the second embodiment of this invention different from the first embodiment of this invention. It should be noted that the process shown in FIG. 7, in the same way as for the process shown in FIG. 4, may be performed by the access to the cache memory unit 105 performed by the host interface unit 101 or by the cache memory unit 105. Alternatively, in the storage system 1, there may be provided a processor unit for carrying out the process.

In the step 305 of FIG. 3, if the cache memory unit 105 determines that the data is present in the flash memory 212 (the flash memory 212 contains the memory area corresponding to the data block of the disk drive 103 to which the access request received from the host computer is directed), the process proceeds to a step 501.

In the step 501, the cache memory unit 105 determines whether the request received from the host computer is a read (RD) request or a write (WR) request. If the request is an RD request, the process proceeds to a step 502.

In the step 502, the cache memory unit 105 reads the requested data from the flash memory 212. Then, the cache memory unit 105 sends the read data to the host interface unit 101 via the transfer unit 104, and the host interface unit 101 sends the data to the host computer, which is the original requester of the data (step 503).

In the step 501, if the cache memory unit 105 determines that the request received from the host computer is a WR request, the process proceeds to a step 504.

In the step 504, the cache memory unit 105 reads present data in the flash memory 212 (data stored in the memory area of the flash memory 212 associated with the data block of the disk drive 103 which is the target of the write request).

Then, in a step 505, the cache memory unit 105 determines whether the DRAM 211 still has a free area. If the DRAM 211 has a free area, the process proceeds to a step 507. If the DRAM 211 does not have a free area, the process proceeds to a step 506.

In the step 506, as in the step 306 of FIG. 3 and in the step 403 of FIG. 4, the cache memory unit 105 performs the DRAM free area collection process. This free area collection process may be performed by the host interface unit 101, which has received the access command from the original host computer, or by the cache memory unit 105, as in the step 306 of FIG. 3 and in the step 403 of FIG. 4. Alternatively, in the storage system 1, there may additionally be provided a processor unit to process the free area collection.

In the step 507, the cache memory unit 105 stores the data read from the flash memory 212 in the step 504 in the free area of the DRAM 211.

Then, the process proceeds to a step 508. In the step 508, the cache memory unit 105 receives write data from the host computer. Then, in a step 509, the cache memory unit 105 updates the data in the DRAM 211 with the received write data.

In the step 303 of FIG. 3, if the cache memory unit 105 determines that the data is present in the DRAM 211 (the DRAM 211 contains the memory area corresponding to the data block of the disk drive 103 which is the target of the access request received from the host computer), the process proceeds to the step 510. In the step 510, the cache memory unit 105 determines whether the request received from the host computer is a read (RD) request or a write (WR) request. If the request received from the host computer is a write (WR) request, the process proceeds to the step 508, and the process subsequent to the step 508 is performed.

In the step 510, if the cache memory unit 105 determines that the request received from the host computer is a read (RD) request, the process proceeds to a step 511. In the step 511, the cache memory unit 105 reads the requested data from the DRAM 211, and sends the data to the host interface unit 101 via the transfer unit 104, and the host interface unit 101 sends the data to the host computer, which is the original requester of the data According to the process shown in FIG. 7, if a request received from the host computer is a read (RD) request, and if requested data is not stored in the DRAM 211, and also if the requested data is stored in the flash memory 212, it is possible to directly read the requested data from the flash memory 212 and to return the read data. In other words, because it is not necessary to write the data to the DRAM 211, it is possible to shorten a response time in a case where the data is stored in the flash memory 212.

Further, as described above, if the cache miss occurs in the DRAM 211, and the cache hit occurs in the flash memory 212, in order to store the data read from the flash memory 212 in the DRAM 211, data in the DRAM 211 may need to be cast out. In other words, the data which has been cast out may need to be written to the flash memory 212. According to the process shown in FIG. 7, if the predetermined conditions are met, because the write to the DRAM 211 is omitted, it is possible to reduce the possibility of the write of data to the flash memory 212.

A description will now be given of the third embodiment of this invention.

Figure 8:
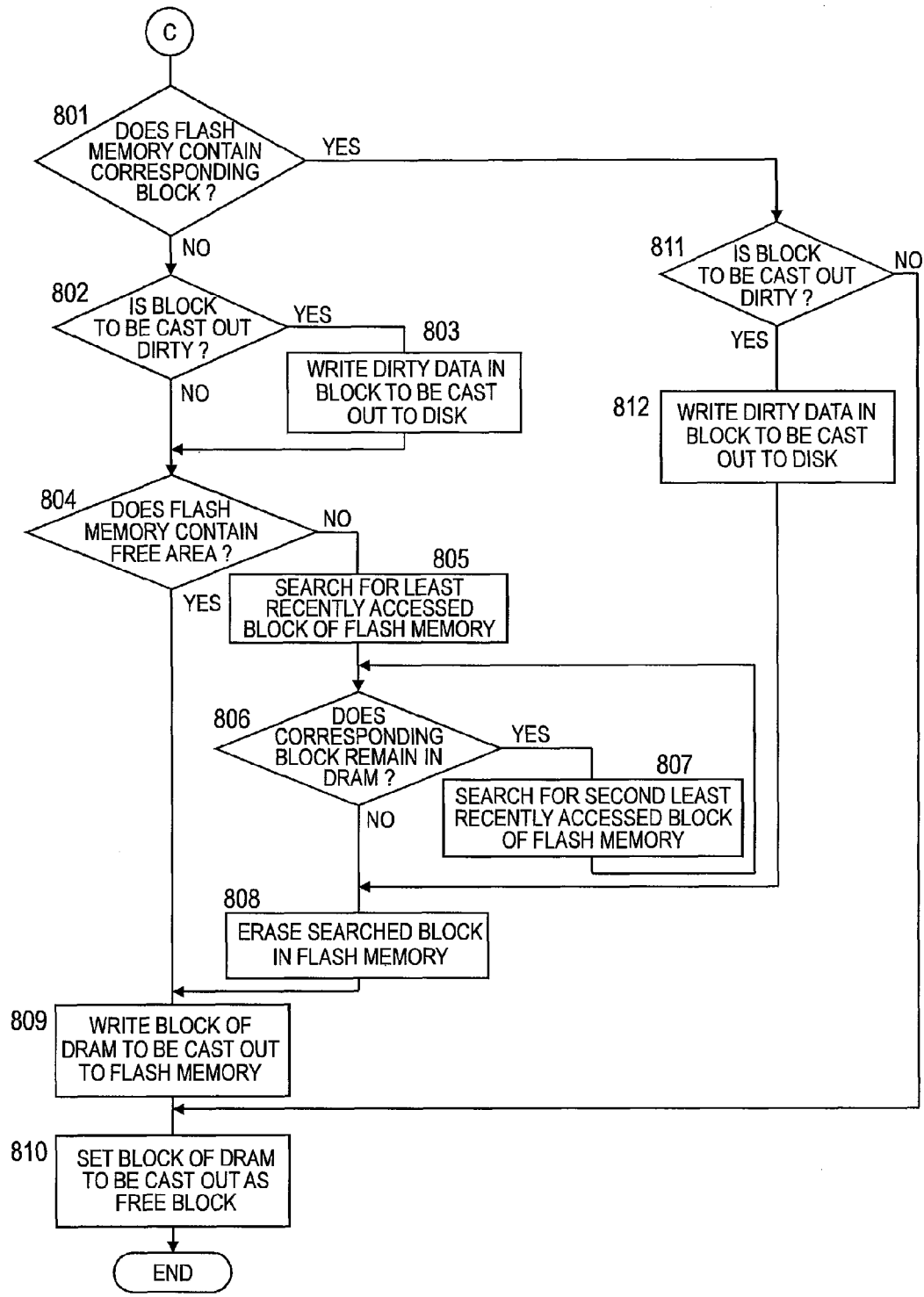
FIG. 8 is a flowchart showing an example of the free area of DRAM collection process carried in the storage system according to the third embodiment of this invention.

Configurations of the storage system 1 and the cache memory unit 105 of the third embodiment of this invention are the same as those of the first embodiment of this invention (see FIGS. 1 and 2). In the storage system 1 according to the third embodiment of this invention, except that a process shown in FIG. 8 is performed in place of the process shown in FIG. 6, the same process as that of the first embodiment of this invention is performed. Hereinafter, a description will be given of only cases of the third embodiment of this invention different from the first embodiment of this invention.

FIG. 8 is a flowchart showing an example of the DRAM free area collection process carried in the storage system 1 according to the third embodiment of this invention.

It should be noted that, according to the third embodiment of this invention, as the DRAM free area collection process in the step 306 of FIG. 3 and in the step 403 of FIG. 4, first, the process shown in FIG. 5 is performed, and then, the process shown in FIG. 8 is performed. The process shown in FIG. 8, as the process shown in FIGS. 5 and 6, may be performed by the host interface unit 101, which has received the access command from the original host computer, or by the cache memory unit 105. Alternatively, in the storage system 1, there may additionally be provided a processor unit to process the free area collection. Hereinafter, a description will be given assuming the process is performed by the cache memory unit 105, for example.

In this embodiment, after the process in the step 603 of FIG. 5 is performed, the process proceeds to a step 801.

In the step 801, the cache memory unit 105 determines whether the flash memory 212 contains a block corresponding to the block of the DRAM 211 selected as the candidate to be cast out in the step 603 of FIG. 5. If the flash memory 212 does not have a block corresponding to the block of the DRAM 211 to be cast out, the process proceeds to a step 802.

In the step 802, the cache memory unit 105 determines whether or not data in the searched block of the DRAM 211 to be cast out is in the dirty state. If the cache memory unit 105 determines that the block to be cast out is not in the dirty state, the process proceeds to a step 804. If the cache memory unit 105 determines that the block to be cast out is in the dirty state, the process proceeds to a step 803.

In the step 803, the cache memory unit 105 writes the data in the block of the DRAM 211 to be cast out to the disk drive 103. Then, the process proceeds to the step 804.

In the step 804, the cache memory unit 105 determines whether the flash memory 212 contains a free area. If the flash memory 212 contains a free area, the process proceeds to a step 809.

In the step 809, the cache memory unit 105 stores data of a block to be cast out in the free area of the flash memory 212.

Then, in a step 810, the cache memory unit 105 sets the block of the DRAM 211 to be cast out as a free block.

In the step 804, if the cache memory unit 105 determines that the flash memory 212 does not contain a free area, the process proceeds to a step 805. In the step 805, the cache memory unit 105 searches for the least recently accessed block of the flash memory 212.

Then, the cache memory unit 105 determines whether or not data in the searched block of the flash memory 212 in the step 805, or in a step 807 described later, still remains in the DRAM 211 (step 806).

If the data still remains in the DRAM 211, the process proceeds to the step 807. In the step 807, the cache memory unit 105 searches for the next least recently accessed block of the flash memory 212. Then, the process returns to the step 806.

In the step 806, if the cache memory unit 105 determines that the data does not remain in the DRAM 211, the process proceeds to a step 808.

In the step 808, the cache memory unit 105 erases the searched block of the flash memory 212, and sets the block as a free area. Then, the process proceeds to the step 809.

In the step 801, if the cache memory unit 105 determines that the flash memory 212 contains a block corresponding to the block of the DRAM 211 to be cast out, the process proceeds to a step 811.

In the step 811, the cache memory unit 105 determines whether or not data in the searched block of the DRAM 211 to be cast out is in the dirty state. If the cache memory unit 105 determines that the block to be cast out is not in the dirty state, the process proceeds to the step 810. In this case, the block to be cast out and the block of the flash memory 212 corresponding thereto store the same data. Therefore, in the step 810, the cache memory unit 105, without writing the data of the block to be cast out to the flash memory 212, sets the block to be cast out of the DRAM 211 to a free block.

In the step 811, if the cache memory unit 105 determines that the data in the block to be cast out is dirty, the process proceeds to the step 812.

In the step 812, the cache memory unit 105 writes the data of the block of the DRAM 211 to be cast out to the disk drive 103.

Then, the process proceeds to the step 808. In this case, the cache memory unit 105 erases the searched block of the flash memory 212 (step 808), and performs the subsequent processes (steps 809 and 810).

In the step 804, even when free areas still remain in the flash memory 212, if the total capacity of the remaining free areas is equal to or less than a predetermined threshold, it is determined that there is not free area any more, and the process may not proceed to the step 809, but may proceed to the step 805.

According to the process shown in FIG. 8, if data in a block to be cast out is dirty, the data is written to the disk drive 103 before the data is written to the flash memory 212. As a result, the flash memory 212 does not contain dirty blocks.

It should be noted that, in this embodiment, as in the second embodiment of this invention, in place of the process shown in FIG. 4, the process shown in FIG. 7 may be performed.

A description will now be given of the fourth embodiment of this invention.

Figure 9:
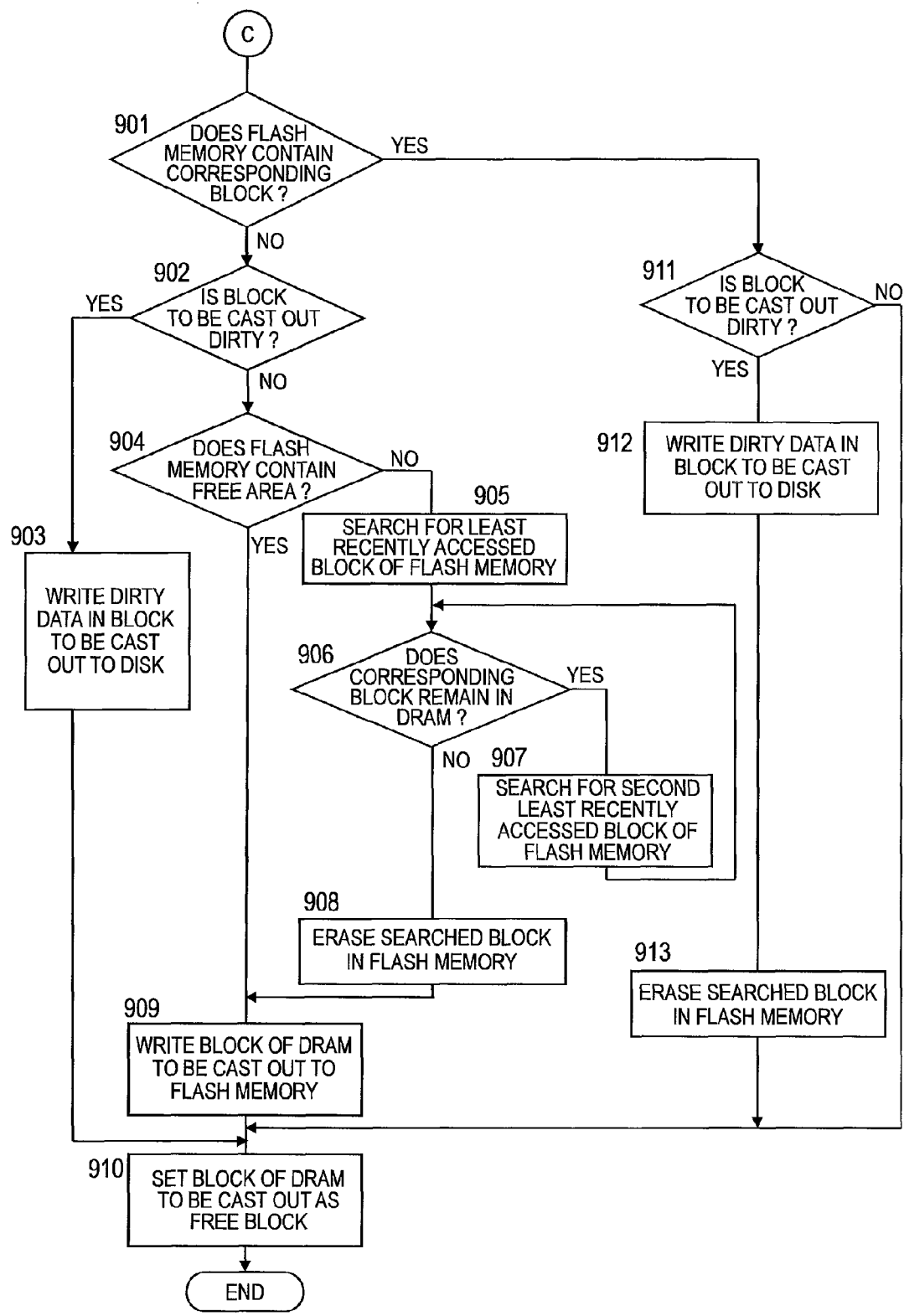
FIG. 9 is a flowchart showing an example of the free area of DRAM collection process carried in the storage system according to the fourth embodiment of this invention.

Configurations of the storage system 1 and the cache memory unit 105 of the fourth embodiment of this invention are the same as those of the first embodiment of this invention (see FIGS. 1 and 2). In the storage system 1 according to the fourth embodiment of this invention, except that a process shown in FIG. 9 is performed in place of the process shown in FIG. 6, the same process as that of the first embodiment of this invention is performed. Hereinafter, a description will be given of only cases of the fourth embodiment of this invention different from the first embodiment of this invention.

FIG. 9 is a flowchart showing an example of the DRAM free area collection process carried in the storage system 1 according to the fourth embodiment of this invention.

It should be noted that, according to the fourth embodiment of this invention, as the DRAM free area collection process in the step 306 of FIG. 3 and in the step 403 in FIG. 4, first, the process shown in FIG. 5 is performed, and then, the process shown in FIG. 9 is performed. The process shown in FIG. 9, as the process shown in FIGS. 5, 6, and 8, may be performed by the host interface unit 101, which has received the access command from the original host computer, or by the cache memory unit 105. Alternatively, in the storage system 1, there may additionally be provided a processor unit to process the free area collection. Hereinafter, a description will be given assuming the process is performed by the cache memory unit 105, for example.

In this embodiment, after the process in the step 603 of FIG. 5 is performed, the process proceeds to a step 901.

In the step 901, the cache memory unit 105 determines whether the flash memory 212 contains a block corresponding to the block of the DRAM 211 selected as the subject to be cast out in the step 603 in FIG. 5. If the flash memory 212 does not have a block corresponding to the block of the DRAM 211 to be cast out, the process proceeds to a step 902.

In the step 902, the cache memory unit 105 determines whether or not data in the block of the DRAM 211 to be cast out is in the dirty state. If the cache memory unit 105 determines that the block to be cast out is not in the dirty state, the process proceeds to a step 904. If the cache memory unit 105 determines that the block to be cast out is in the dirty state, the process proceeds to a step 903.

In the step 903, the cache memory unit 105 writes the data in the block of the DRAM 211 to be cast out to the disk drive 103. Then, the process proceeds in a step 910.

In the step 904, the cache memory unit 105 determines whether the flash memory 212 contains a free area. If the flash memory 212 contains a free area, the process proceeds to a step 909.

In the step 909, the cache memory unit 105 stores data to be cast out in the free area of the flash memory 212.

Then, in the step 910, the cache memory unit 105 sets the block of the DRAM 211 to be cast out as a free block.

In the step 904, if the cache memory unit 105 determines that the flash memory 212 does not contain a free area, the process proceeds to a step 905. In the step 905, the cache memory unit 105 searches for the least recently accessed block of the flash memory 212.

Then, the cache memory unit 105 determines whether or not data in the searched block of the flash memory 212 in the step 905, or in a step 907 described later, still remains in the DRAM 211 (step 906).

If the data still remains in the DRAM 211, the process proceeds to the step 907. In the step 907, the cache memory unit 105 searches for the next least recently accessed block of the flash memory 212. Then, the process returns to the step 906.

In the step 906, if the cache memory unit 105 determines that the data does not remain in the DRAM 211, the process proceeds to a step 908.

In the step 908, the cache memory unit 105 erases the searched block of the flash memory 212, and sets the block as a free area. Then, the process proceeds to the step 909.

In the step 901, if the cache memory unit 105 determines that the flash memory 212 contains a block corresponding to the block of the DRAM 211 to be cast out, the process proceeds to a step 911.

In the step 911, the cache memory unit 105 determines whether or not data in the block of the DRAM 211 to be cast out is in the dirty state. If the cache memory unit 105 determines that the block to be cast out is not in the dirty state, the process proceeds to the step 910. In this case, the block to be cast out and the block of the flash memory 212 corresponding thereto store the same data. Therefore, in the step 910, the cache memory unit 105, without writing the data of the block to be cast out to the flash memory 212, sets the block to be cast out of the DRAM 211 to a free block.

In the step 911, if the cache memory unit 105 determines that the data in the block to be cast out is dirty, the process proceeds to a step 912.

In the step 912, the cache memory unit 105 writes the data in the block of the DRAM 211 to be cast out to the disk drive 103.

Then, in a step 913, the cache memory unit 105 erases the block of the flash memory 212. Then, the process proceeds to a step 910.

In the step 904, even when free areas still remain in the flash memory 212, if the total capacity of the remaining free areas is equal to or less than a predetermined threshold, it is determined that there is not free area any more, and the process may not proceed to the step 909, but may proceed to the step 905.

According to the process shown in FIG. 9, if data in a block to be cast out is dirty, the data is not written to the flash memory 212. As a result, the flash memory 212 does not contain dirty blocks.

It should be noted that, in this embodiment, as in the second embodiment of this invention, in place of the process shown in FIG. 4, the process shown in FIG. 7 may be performed.

A description will now be given of the fifth embodiment of this invention.

Figure 10:
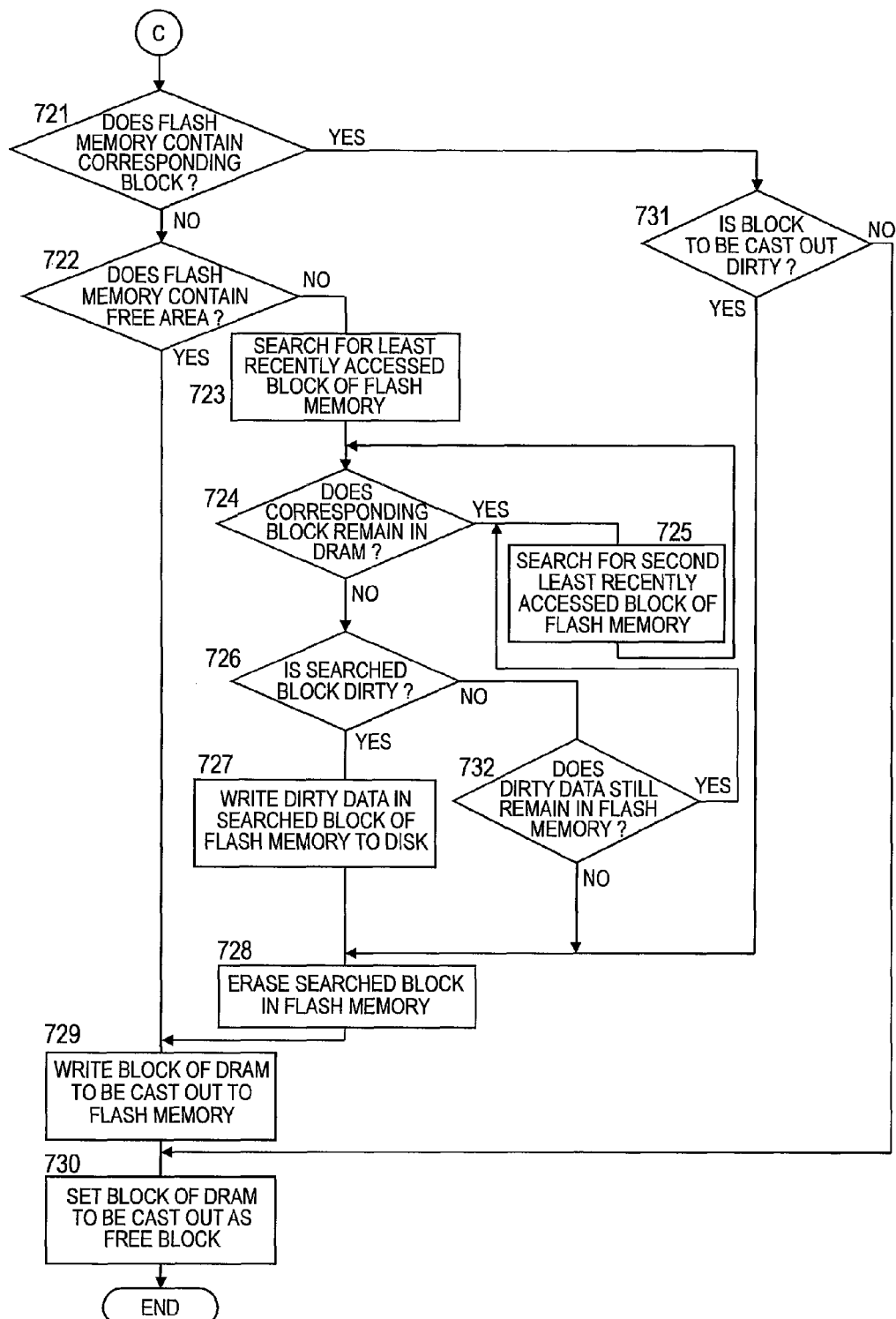
FIG. 10 is a flowchart showing an example of the free area of DRAM collection process performed in the storage system according to the fifth embodiment of this invention.

Configurations of the storage system 1 and the cache memory unit 105 of the fifth embodiment of this invention are the same as those of the first embodiment of this invention (see FIGS. 1 and 2). In the storage system 1 according to the fifth embodiment of this invention, except that a process shown in FIG. 10 is performed in place of the process shown in FIG. 6, the same process as that of the first embodiment of this invention is performed. Hereinafter, a description will be given of only cases of the fifth embodiment of this invention different from the first embodiment of this invention.

FIG. 10 is a flowchart showing an example of the DRAM free area collection process performed in the storage system 1 according to the fifth embodiment of this invention.

It should be noted that, according to the fifth embodiment of this invention, as the DRAM free area collection process in the step 306 of FIG. 3 and in the step 403 of FIG. 4, first, the process shown in FIG. 5 is performed, and then, the process shown in FIG. 10 is performed. The process shown in FIG. 10, as the process shown in FIGS. 5, 6, 8, and 9, may be performed by the host interface unit 101, which has received the access command from the original host computer, or by the cache memory unit 105. Alternatively, in the storage system 1, there may additionally be provided a processor unit to process the free area collection. Hereinafter, a description will be given assuming the process is performed by the cache memory unit 105, for example.

In this embodiment, after the process in the step 603 of FIG. 5 is performed, the process proceeds to a step 721.

In the step 721, the cache memory unit 105 determines whether the flash memory 212 contains a block corresponding to the block of the DRAM 211 selected as the candidate to be cast out in the step 603 of FIG. 5. If the flash memory 212 does not have a block corresponding to the block of the DRAM 211 to be cast out, the process proceeds to a step 722.

In the step 722, the cache memory unit 105 determines whether the flash memory 212 contains a free area. If the flash memory 212 contains a free area, the process proceeds to a step 729.

In the step 729, the cache memory unit 105 stores data to be cast out in the free area of the flash memory 212.

Then, in a step 730, the cache memory unit 105 sets the block of the DRAM 211 to be cast out as a free block.

In the step 722, if the cache memory unit 105 determines that the flash memory 212 does not contain a free area, the process proceeds to a step 723.

In the step 723, the cache memory unit 105 searches for the least recently accessed block of the flash memory 212.

Then, the cache memory unit 105 determines whether or not data in the searched block of the flash memory 212 in the step 723, or in a step 725 described later, still remains in the DRAM 211 (724). If the data still remains in the DRAM 211, the process proceeds to the step 725. In the step 705, the cache memory unit 105 searches for the next least recently accessed block of the flash memory 212. Then, the process returns to the step 724.

In the step 724, if the cache memory unit 105 determines that the data does not remain in the DRAM 211, the process proceeds to a step 726.

In the step 726, the cache memory unit 105 determines whether or not data in the searched block of the flash memory 212 is in the dirty state. If the cache memory unit 105 determines that the data of the searched block is in the dirty state, the process proceeds to a step 727. In the step 727, the cache memory unit 105 writes the data of the searched block of the flash memory 212 to the disk drive 103. Then, the process proceeds to a step 728.

In the step 726, if the cache memory unit 105 determines that the data in the searched block is not dirty, the process proceeds to a step 732. In the step 732, the cache memory unit 105 determines whether other dirty data remains in the flash memory 212. If dirty data does not remain, the process proceeds to the step 728. If dirty data remains, the process proceeds to the step 725. In the step 725, the cache memory unit 105 searches again for the next least recently accessed block of the flash memory 212. Then, the process returns to the step 724, and the process subsequent to the step 724 is performed.

In the step 728, the cache memory unit 105 erases the searched block of the flash memory 212, and sets the block as a free area. Then, the process proceeds to a step 729.

In the step 721, if the cache memory unit 105 determines that the flash memory 212 contains a block corresponding to the block of the DRAM 211 to be cast out, the process proceeds to a step 731.

In the step 731, the cache memory unit 105 determines whether or not data in the block to be cast out of the DRAM 211 is dirty. If the cache memory unit 105 determines that the block to be cast out is not dirty, the process proceeds to the step 730. In this case, the block of the DRAM 211 to be cast out and the block of the flash memory 212 corresponding thereto store the same data. Therefore, the cache memory unit 105, without writing the data in the block to be cast out to the flash memory 212, in the step 730, sets the block of the DRAM 211 to a free block.

In the step 731, if the cache memory unit 105 determines that the data in the block to be cast out is dirty, the process proceeds to the step 728, and the process subsequent to the step 728 is performed.

In the step 722, even when free areas still remain in the flash memory 212, if the total capacity of the free areas is equal to or less than a predetermined threshold, it is determined that there is not free area any more, and the process may not proceed to the step 729, but may proceed to the step 723.

With reference to the process shown in FIG. 10, it is possible to be cast out dirty blocks by priority from the flash memory 212.

It should be noted that, in this embodiment, as in the second embodiment of this invention, in place of the process shown in FIG. 4, the process shown in FIG. 7 may be performed.

The above processes shown in FIGS. 3 to 10 may be realized by the execution of the control program 214 stored in the local memory 213 by the control MPU 210 of the cache memory unit 105, or may be realized by another processor. For example, at least one of the host interface unit 101, the drive interface unit 102, and the transfer unit 104 may include a processor (not shown) and a memory (not shown) each similar to the control MPU 210 and the local memory 213. In this case, any of those processors may perform the processes shown in FIGS. 3 to 10, or a plurality of processors may in corporation perform the processes shown in FIGS. 3 to 10. Alternatively, in the storage system 1, there may be provided a processor unit to perform those processes.

According to the above embodiments of this invention, by replacing a part of a cache memory in a storage system with flash memories with a low cost, it is possible to enlarge the capacity of the cache memory at a low cost. Since the flash memory is non-volatile, batteries for retaining data during a power down can be eliminated. Therefore, it is possible to reduce the size, weight, and power consumption of the cache memory. Further, according to the embodiments of this invention, the DRAM is used by priority, and in the flash memory, data with a low access rate, especially data with a low write access rate is stored by priority. As a result, it is possible to prevent the performance from degrading due to the use of the flash memories.

The present invention may be applied to a storage system including hard disk drives and cache memories.

Representative aspects of this invention, in addition to the aspects described in the claims, are listed below.

(1) A storage system, including:
one or more host interfaces coupled to one or more host computers;
one or more disk drives;
one or more drive interfaces coupled to the disk drives;
one or more cache memories for temporarily storing at least one of data read from the disk drives and data to be written to the disk drives; and
one or more control processors, in which:
the cache memory includes one or more volatile first memories, and one or more non-volatile second memories;
the volatile first memories, and the non-volatile second memories each include a plurality of memory areas;
each of the plurality of memory areas of the volatile first memories and the plurality of memory areas of the non-volatile second memories belongs either to the first kind of memory area which is associated with the data blocks of the disk drives, or to the second kind of memory area which is not associated with the data blocks of the disk drives;
the control processors control write and read of data to and from the volatile first memories and the non-volatile second memories; and
the control processors are configured to:
receive requests for writing data to the disk drives, or for reading data from the disk drives;
store the requested data in the volatile first memories;
select, if a total capacity of the second memory area included in the volatile first memories is smaller than a predetermined threshold, one of a plurality of the first kind of memory areas of the volatile first memories;
write data stored in the selected first memory area of the volatile first memories to the non-volatile second memories; and
change the selected first kind of memory area of the volatile first memories to the second kind of memory area of the volatile first memories.

(2) The storage system according to item (1), in which the control processors are further configured to:
determine whether data stored in the selected first kind of memory area of the volatile first memories is stored in the disk drives or not; and
write, upon determining that the data stored in the selected first kind of memory area of the volatile first memories is not stored in the disk drive, the data stored in the selected first kind of memory area of the volatile first memories to the disk drive, without writing the data stored in the selected first kind of memory area of the volatile first memories to the non-volatile second memories.

(3) The storage system according to item (1), in which the control processors are further configured to:
determine whether data stored in the selected first kind of memory area of the volatile first memories is stored in the disk drives or not; and
further write, upon determining that the data stored in the selected first kind of memory area of the volatile first memories is not stored in the disk drives, and the data stored in the selected first kind of memory area of the volatile first memories to the disk drives.

(4) The storage system according to item (1), in which the control processors are further configured to:
determine, if the requested data is not stored in the volatile first memories, whether the requested data is stored in the non-volatile second memories or not;
determine whether the received request is a request for reading the data from the disk drives or not;
read, upon determining that the requested data is stored in the non-volatile second memories, and the received request is a request for reading the data from the disk drives, the requested data from the non-volatile second memories; and
store the read data in the volatile first memories, and send the read data to the host computer which sent the request.

(5) The storage system according to item (1), in which the control processors are further configured to:
determine, if the requested data is not stored in the volatile first memories, whether the requested data is stored in the non-volatile second memories or not;
determine whether the received request is a request for reading the data from the disk drives or not;
read, upon determining that the requested data is stored in the non-volatile second memories, and the received request is a request for reading the data from the disk drives, the requested data from the non-volatile second memories; and
send the read data to the host computer which sent the request without storing the read data in the volatile first memories.

What is claimed is:
1. A storage system comprising:
a plurality of drives storing data and configuring a plurality of RAID (Redundant Array of Independent Disks) groups;
a random access memory temporarily storing data read from the plurality of drives;
a flash memory temporarily storing data casted out from the random access memory, the flash memory having a capacity larger than a capacity of the random access memory; and
a processor, upon receiving a read request which requests to read first data, reading the first data from the flash memory when the first data is not stored in the random access memory and is stored in the flash memory.
2. The storage system according to claim 1, wherein the processor selects clean data stored in the random access memory, casts out the clean data from the random access memory, and stores the casted out clean data to the flash memory.

3. The storage system according to claim 1, wherein the processor selects clean data from data stored in the random access memory, casts out the clean data from the random access memory, and stores the casted out clean data to the flash memory.

4. The storage system according to claim 1, wherein the processor reads the first data from the plurality of drives and stores the read first data to the random access memory when the first data is not stored in the random access memory and the flash memory.

5. The storage system according to claim 4, wherein the processor casts out certain data from the random access memory if the random access memory does not contain a free area for storing the first data read from the plurality of drives.

6. The storage system according to claim 4, wherein the processor casts out certain data from the random access memory if a total capacity of free areas in the random access memory is smaller than a threshold.

7. The storage system according to claim 1, wherein the processor deletes certain data stored in the flash memory if the flash memory does not contain free area for storing data casted out from the random access memory.

8. The storage system according to claim 1, wherein performance of the flash memory is lower than performance of the random access memory.

9. The storage system according to claim 1, wherein the processor determines whether the first data is stored in the flash memory after determining the first data is not stored in the random access memory.

10. The storage system according to claim 1, wherein data casted out from the random access memory is the least recently used data.

11. A storage system comprising:
a plurality of drives storing data and configuring a plurality of RAID (Redundant Array of Independent Disks) groups;
a random access memory temporarily storing data read from the plurality of drives;
a flash memory having a capacity that is larger than a capacity of the random access memory; and
a processor storing data casted out from the random access memory to the flash memory, and upon receiving a read request which requests to read first data, reading the first data from the random access memory when the first data is stored in the random access memory, and reading the first data from the flash memory when the first data is not stored in the random access memory and is stored in the flash memory.

12. The storage system according to claim 11, wherein the data casted out from the random access memory and stored in the flash memory is clean data.

13. The storage system according to claim 11, wherein the processor selects clean data from data stored in the random access memory, casts out the clean data from the random access memory, and stores the casted out clean data to the flash memory.

14. The storage system according to claim 11, wherein the processor reads the first data from the plurality of drives and stores the read first data to the random access memory when the first data is not stored in the random access memory and the flash memory.

15. The storage system according to claim 14, wherein the processor casts out certain data from the random access memory if the random access memory does not contain free area for storing the first data read from the plurality of drives.

16. The storage system according to claim 14, wherein the processor casts out certain data from the random access memory if a total capacity of free areas in the random access memory is smaller than a threshold.

17. A storage system comprising:
a plurality of drives storing data and configuring a plurality of RAID (Redundant Array of Independent Disks) groups;
a random access memory temporarily storing data read from the plurality of drives;
a flash memory temporarily storing data cast out from the random access memory, the flash memory having a capacity larger than a capacity of the random access memory; and
a processor, upon receiving a read request which requests to read first data, reading the first data from the random access memory when the first data is stored in the random access memory, determining whether the first data is stored in the flash memory after determining the first data is not stored in the random access memory, and reading the first data from the flash memory when the first data is stored in the flash memory.

18. The storage system according to claim 17, wherein the data casted out from the random access memory and stored in the flash memory is clean data.

19. The storage system according to claim 17, wherein the processor selects clean data from data storing in the random access memory, casts out the clean data from the random access memory, and stores the casted out clean data to the flash memory.

20. The storage system according to claim 17, wherein the processor reads the first data from the plurality of drives and stores the read first data to the random access memory when the first data is not stored in the random access memory and the flash memory.

21. The storage system according to claim 20, wherein the processor casts out certain data from the random access memory if the random access memory does not contain free area for storing the first data read from the plurality of drives.

22. The storage system according to claim 20, wherein the processor casts out certain data from the random access memory if a total capacity of free areas in the random access memory is smaller than a threshold.

* * * * *